Jan. 23, 1934. M. H. LEVY 1,944,290
RETURN BEND CLOSURE
Original Filed May 26, 1930 2 Sheets-Sheet 1
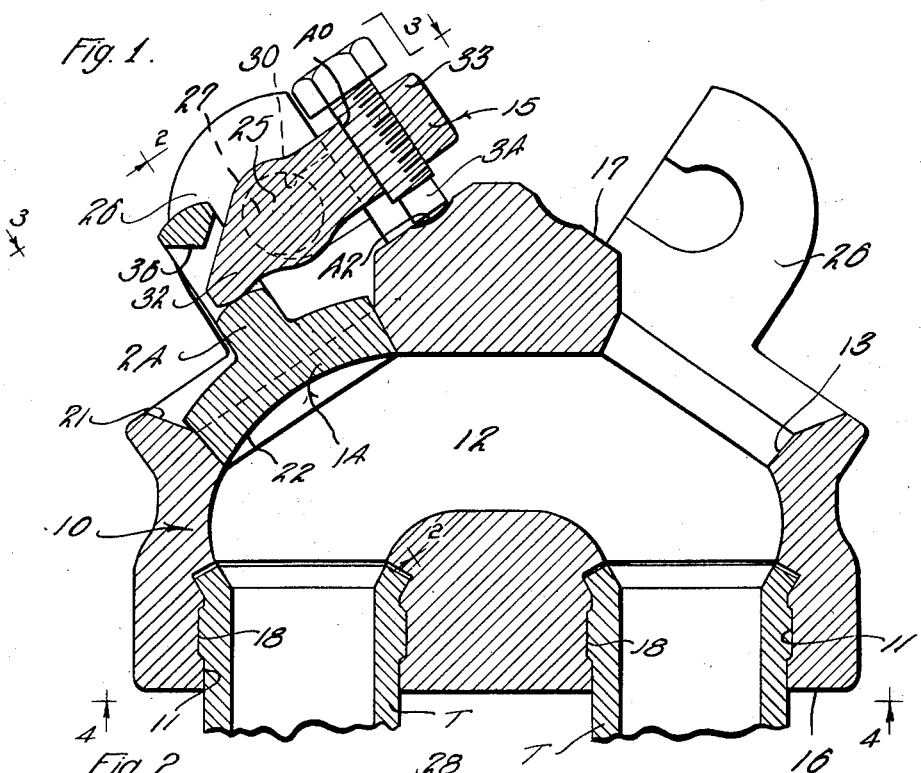
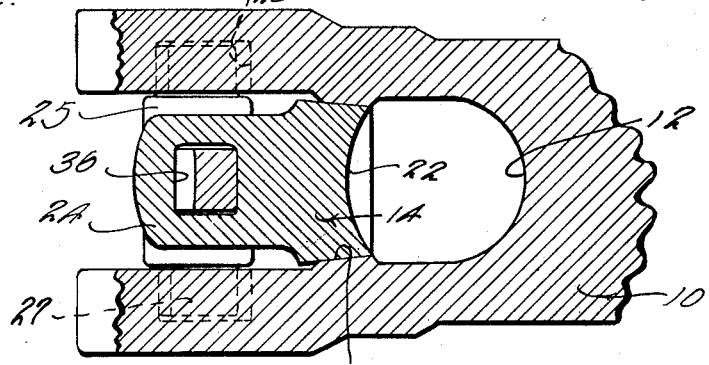
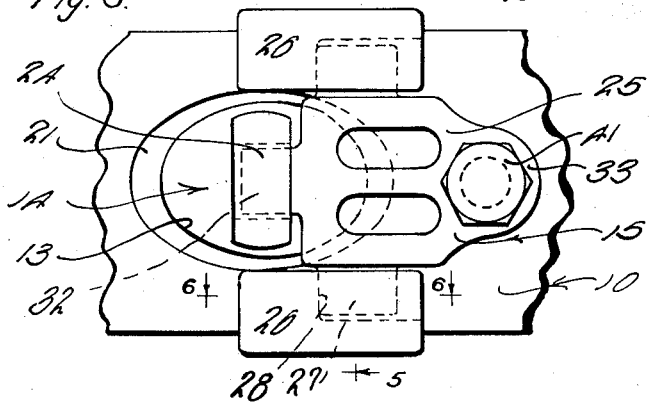
Inventor
MARK H. LEVY
By
His Attorney Jan. 23, 1934.　　　M. H. LEVY　　　1,944,290
RETURN BEND CLOSURE
Original Filed May 26, 1930　　2 Sheets-Sheet 2

Inventor
MARK H. LEVY
By
His Attorney

Patented Jan. 23, 1934

1,944,290

UNITED STATES PATENT OFFICE 1,944,290

RETURN BEND CLOSURE

Mark H. Levy, Los Angeles, Calif.

Application May 26, 1930, Serial No. 455,596
Renewed December 4, 1933

7 Claims. (Cl. 137—76)

This invention has to do with a junction box for connecting tubing, and the like, and it is a general object of the invention to provide a simple, practical, and improved closure means for the service opening of a return bend or junction box for use on boilers, stills, etc. where fluids are handled at high pressures.

Junction boxes or return bends are employed on boilers, stills, etc. where spaced tubes or flues are arranged in banks. The junction boxes serve to hold the ends of the tubes and to conduct or pass fluid between the tubes. It is desirable to provide junction boxes with service openings opposite the tubes for the insertion of tubing rollers, cleaners, etc. The service openings of the common types of junction boxes are shaped and positioned so that it is very inconvenient to reach all parts of the interior of the box. Further, the service openings of the usual forms of junction boxes are closed by closures or caps held in place by spiders, or the like, which are usually cumbersome and large and project a considerable distance from the junction box.

It is an object of the invention to provide a return bend or junction box having service openings formed and positioned so that the tubes and all parts of the interior of the box are readily accessible for cleaning, etc. when the service opening closures are removed.

It is another object of the invention to provide a junction box of the character mentioned that is simple and compact and that may be formed with only the necessary service openings in addition to the tube-carrying openings.

It is another object of the invention to provide a compact and effective means for retaining the service opening closures in sealing position which may be easily detached when the closures are removed for cleaning the tubes, etc.

It is a further object of the invention to provide a junction box in which the fluid passage and the inner sides of the service opening closures are formed to offer a minimum amount of resistance to the passage of fluid.

Figure 4:
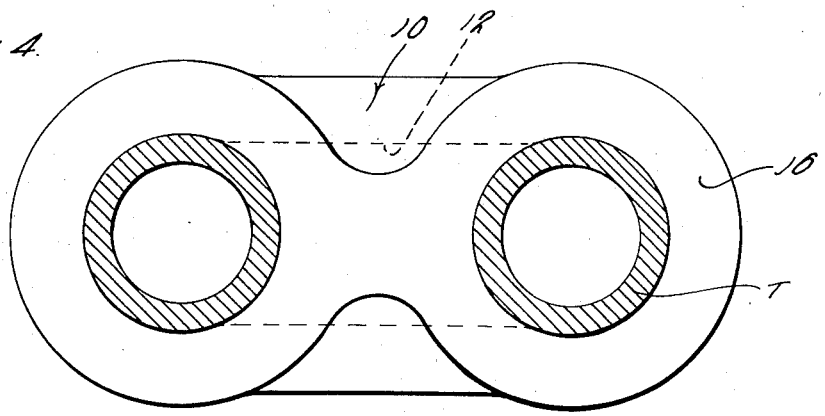
Figure 5:
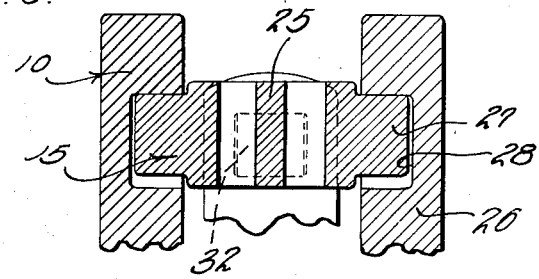
Figure 6:
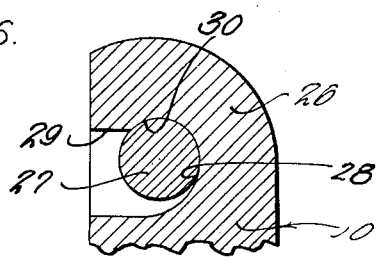

Other objects and features of my invention will be best and more fully understood from the following detailed description of a typical form and application of the invention, throughout which description reference is had to the accompanying drawings, in which:

Fig. 1 is a longitudinal detailed sectional view of the junction box provided by the present invention showing the device with one of the service opening closures removed. Fig. 2 is a transverse detailed sectional view taken substantially as indicated by line 2—2 on Fig. 1. Fig. 3 is a top or plan view of a portion of the device, being a view taken as indicated by line 3—3 on Fig. 1. Fig. 4 is an end view of the junction box, being a view of the inner end of the box. Fig. 5 is a transverse detailed sectional view taken as indicated by line 5—5 on Fig. 3, and Fig. 6 is a detailed fragmentary view taken as indicated by line 6—6 on Fig. 3.

The junction box in which the present invention is embodied is intended primarily to join or form a return connection between two parallel flues or tubes. The device is particularly adapted for use on boilers, stills, and the like, where high pressures are encountered, and in the following detailed description a simple form of the device particularly adapted for such use will be described. In the drawings the junction box is shown connecting two parallel horizontal spaced tubes T and is illustrated arranged in a horizontal position. It is to be understood that the junction box may be vertically positioned or disposed at any desired angle as the circumstances may require.

The junction box or return bend includes, generally, a body 10 having spaced tube-receiving openings 11, a transverse port 12 connecting the openings 11 and having service openings 13, closures 14 for the service openings 13, and means 15 for removably clamping or retaining the closures 14 in sealing position in the openings 13.

The body 10 is preferably a single unitary member and is shaped to present a flat inner end 16 and a pointed or convex outer end providing two beveled or angularly disposed outer sides 17. The outer sides 17 are preferably flat as illustrated throughout the drawings. The tube openings 11 for receiving the tubes T extend into the body 10 from the inner end 16 at spaced points opposite the angularly related outer sides 17. The mouths or outer portions of the openings 11 may be suitably formed to effectively or tightly carry the ends of the tubes T. In the particular case shown in the drawings the ends of the tubes T are rolled into enlargements or annular recesses 18 in the openings 11. The connecting port 12 extends between and connects the tube openings 11. The port 12 is shaped and proportioned to offer a minimum of resistance to the flow of fluid between the tubes T. The walls of the port 12 opposite the tube openings 11 are curved in a manner to effectively direct fluid through the box. The port 12 may be substantially round or elliptical in its cross sectional configuration throughout its length, or may have two opposite flattened side walls as illustrated in Fig. 2 of the drawings.

The service openings 13 are provided in the angular outer sides 17 of the body 10 in alignment with or opposite the tube openings 11. The service openings 13 communicate with the port 12 and are formed on axes extending at right angles to the angular faces 17. The service openings 13 are proportioned and located so that they will accommodate or pass tubing rollers or tubing cleaners into the tubing T and so that the port 12 is readily accessible for cleaning. In accordance with the preferred form of the invention the service openings 13 are elliptical in their cross sectional configuration. The major axes of the ellipses of the two openings 13 extend in the same direction and extend parallel to or in the same direction as the longitudinal axis of the transverse port 12. The outer portions 21 of the walls of the openings 13 may be beveled or tapered outwardly as clearly illustrated in the drawings.

The service opening closures 14 are adapted to be removably arranged in the service openings 13. The closures 14 are arranged in the openings 13 so that their inner ends or sides 22 form continuations of the walls of the port 12. In Fig. 1 of the drawings only one of the closures 14 with its retaining means 15 is shown in connection with the junction box, it being understood that the other service opening 13 may be closed by a similar closure 14 retained in position by a similar retaining means 15. The inner sides 22 of the closures 14 are made concave and are curved to form unbroken continuations of the walls of the port 12 when the closures are in tight sealing position in the service openings. The closures 14 are adapted to be fitted in the openings 11 and their inner sides 22 are shaped so that they form symmetrical and unbroken continuations of the curved outer walls of the port 12. With the closures 14 formed in this manner, there are no recesses or interruptions in the walls of the port 12 to cause eddy currents in the fluid passing through the port 12. The closures 14 are elliptical in their general configuration and their peripheries are finished to tightly seal with the walls of the openings 13. In the preferred form of the invention the walls of the service openings 13 diverge outwardly or are tapered outwardly and the peripheries of the closures 14 are formed to tightly fit the openings 13. In accordance with the invention a centrally located outwardly projecting stem 24 is provided on the outer side of each closure 14.

The means 15 for holding or clamping the closures 14 in sealing position in the service openings 13 is such that the closures may be easily and quickly arranged in the openings and removed from the openings. In accordance with the invention there is a separate means 15 provided for holding each closure 14 so that the closures 14 may be handled individually. Further, the principal element or clamping member 25 of each means 15 is mounted so that it may be removed from the junction box when the closure 14 is removed so that it does not interfere with the free insertion of cleaners, etc., through the opening 13. Each means 15 for holding a closure 14 in its closing position includes spaced ears or lugs 26 at an opening 13, and the clamping or retaining member 25 pivotally and removably carried by the lugs 26 to engage the stem 24 of the closure 14. The lugs 26 project outwardly from the angular sides 17 of the box at opposite sides of each of the openings 13. The lugs 26 may be formed integral with the body 10. The lugs 26 are offset or spaced inwardly of the central axes of the service openings 13. The lugs 26 may be made comparatively heavy and their inner sides may be flat and parallel.

A closure retaining or clamping member 25 is pivotally mounted between each pair of lugs 26. Pins 27 project laterally outward from the opposite sides of each member 25 to seat in sockets 28 in the inner sides of the lugs 26. The pins 27 may be integral with the members 25 and are preferably round in cross section to freely pivot or rotate in the sockets 28. The pins 27 are removably arranged in the sockets 28. Channels or passages 29 extend from the inner edges of the lugs 26 and connect with the sockets 28. The passages 29 are provided to pass the pins 27 when the members 25 are positioned between the lugs 26. In the preferred form of the invention the sockets 28 extend or curve upwardly at the inner ends of the channels 29 to provide seats 30 for carrying the pins 27 when the members 25 are in clamping engagement with the stems 24.

The retaining or clamping members 25 are in the form of levers pivotally supported by the pins 27 and each includes an outer arm 32 for engaging a closure stem 24 and an inner arm 33 carrying a screw 34 for engaging the body 10. The outer arms 32 of the retaining members 25 extend or project into transverse openings 36 in the stems 24. The openings 36 extend transversely through the stems 24 and are proportioned to effectively receive the outer arms 32. The inner arms 33 extend substantially parallel to the angular sides 17 and are spaced from the sides 17 when the members 25 are in retaining positions. The inner arms 33 may be longer than the outer arms 32 to provide the desired leverage for operating or clamping the closures 14 into the openings 13. The screws 34 are threaded through transverse openings 40 in the arm 33 and their inner ends engage the body 10. The screws 34 may be in the form of bolts having polygonal heads 41 at their outer ends. The inner ends of the bolts or screws 34 may seat in sockets 42 in the sides 17 when in operating position. It will be obvious how threading of the screws 34 through the openings 40 so that the ends of the screws react against the body 10 will cause the inner arms 33 to be forced outwardly and the outer arms 32 to be shifted inwardly to force the closures 14 into the openings 13. When the members 25 are in retaining position, the pins 27 seat outwardly in the seats 30 which hold the pins against displacement through the passages 29.

It is believed that the utility and practicability of the invention will be readily apparent from the foregoing detailed description. The invention provides a simple construction wherein a unitary body is provided with tube openings and a connecting port which are shaped to effectively pass fluid with but little resistance. The service openings 13 are shaped and positioned in the angular faces or sides 17 so that tools and cleaners may be easily passed through them into the tubes T and so that the walls of the connecting port 12 are readily accessible for cleaning, etc. The retaining means 15 is such that it does not interfere with the operation of tools or cleaners through the service openings 13. The clamping members 25 are easily and quickly removed when it is desired to remove the closures 14.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device of the character described including a body having a service opening, a closure for the service opening, and means for detachably retaining the closure in the opening including spaced lugs on the body, a retaining member detachably pivotally carried between the lugs, the retaining member including arms projecting from opposite sides of its pivotal axis, one arm operatively engaging the closure whereby the member is operable to force the closure into and out of the service opening and a screw on the other arm for engaging the body to pivot the member in a direction to force the closure into the opening.

2. A device of the character described including a body having a service opening, a closure for the service opening, a stem on the closure having a transverse opening, and means for detachably retaining the closure in the opening including spaced lugs on the body, a retaining member detachably pivotally carried between the lugs, the retaining member including arms projecting from opposite sides of its pivotal axis, one arm cooperating with the opening in the stem, and a screw threaded through an opening in the other arm to react against the body to hold the member in retaining position.

3. A device of the character described including a body having a service opening, a closure for the service opening, and means for detachably retaining the closure in the opening including spaced lugs on the body, a retaining member, pins projecting from the member to pivotally seat in sockets in the inner sides of the lugs, there being passages in the inner sides of the lugs for passing the pins into the sockets, the member engaging the closure, and a screw threaded through an opening in the member to engage the body for holding the member in the closure retaining position.

4. A device of the character described including a body having a service opening, a closure for the service opening, a stem on the closure, and means for retaining the closure in the opening including spaced lugs at opposite sides of the opening and off-set from the central axis of the opening, a retaining member pivotally carried by the lugs having an end operatively engaging the stem whereby the member is operable to force the closure into and out of the service opening and a screw on the opposite end of the member for engaging the body to hold the member in a position where it retains the closure in the opening.

5. A device of the character described including a body having a service opening, a closure for the service opening, a stem on the closure, and means for retaining the closure in the opening including spaced lugs at the opening off-set from the central axis of the opening, a retaining member pivotally and removably carried by the lugs, the member including an outer arm to extend into an opening in the stem, and an inner arm, and a screw threaded through an opening in the inner arm to react with the body to pivot the member in a direction to force the closure to the closed position.

6. A device of the character described including, a body having a service opening, a closure for the service opening, and means for detachably retaining the closure in the opening including spaced lugs on the body, a stem on the closure having an opening, a lever pivotally carried by the lugs having an arm extending into the opening in the stem and having a second arm, and screw means carried by the second arm for cooperating with the body to pivot the lever in a direction to force the closure into the service opening, the second arm being adapted to be acted upon to pivot the lever in the other direction to remove the closure from the service opening.

7. A device of the character described including, a body having a service opening, a closure for the service opening, and means for detachably retaining the closure in the opening including spaced lugs on the body, a stem on the closure having an opening, a lever, means detachably and pivotally mounting the lever on the lugs, the lever having an arm extending into the opening in the stem and having a second arm, and screw means on the second arm for cooperating with the body to pivot the lever in a direction to force the closure into the service opening, the second arm being adapted to be acted upon to pivot the lever.

MARK H. LEVY.